Aug. 21, 1956

M. EATON 2,759,988

FLEXIBLE CABLES FOR ELECTRIC FURNACES

Filed Feb. 19, 1953

M. EATON
INVENTOR

BY D.R. Morrison

AGENT.

Aug. 21, 1956   M. EATON   2,759,988
FLEXIBLE CABLES FOR ELECTRIC FURNACES
Filed Feb. 19, 1953   2 Sheets-Sheet 2

M. EATON
INVENTOR
BY D.R. Morrison
AGENT.

United States Patent Office 2,759,988
Patented Aug. 21, 1956

2,759,988

FLEXIBLE CABLES FOR ELECTRIC FURNACES

Milton Eaton, Shawinigan Falls, Quebec, Canada, assignor to Shawinigan Chemicals Limited, Montreal, Quebec, Canada, a corporation of Canada Application February 19, 1953, Serial No. 337,841

10 Claims. (Cl. 174—28)

This invention relates to electrical conductor cables, and more particularly to electrical conductor cables of restricted flexibility, for carrying unusually heavy currents.

There are various applications in industry for conductors designed to carry heavy currents and at the same time to accommodate movement of the apparatus with which they are connected. Electric furnaces of various types and electric welding equipment are examples.

The most important application for electrical conductor cable of the type referred to is as essential parts of the low-voltage connections to the electrodes of electric furnaces. For this purpose their most desirable characteristics are: (1) flexibility to accommodate vertical movement of the electrodes; (2) ability to carry very heavy currents; (3) mechanical construction to withstand severe operating conditions; and (4) property of being self-supporting when mounted in an arched position.

The principal object of the invention is to provide a water-cooled flexible cable suitable for electric furnaces.

The invention may be understood from the following detailed description thereof, reference being made to accompanying drawings in which.

Figure 4:
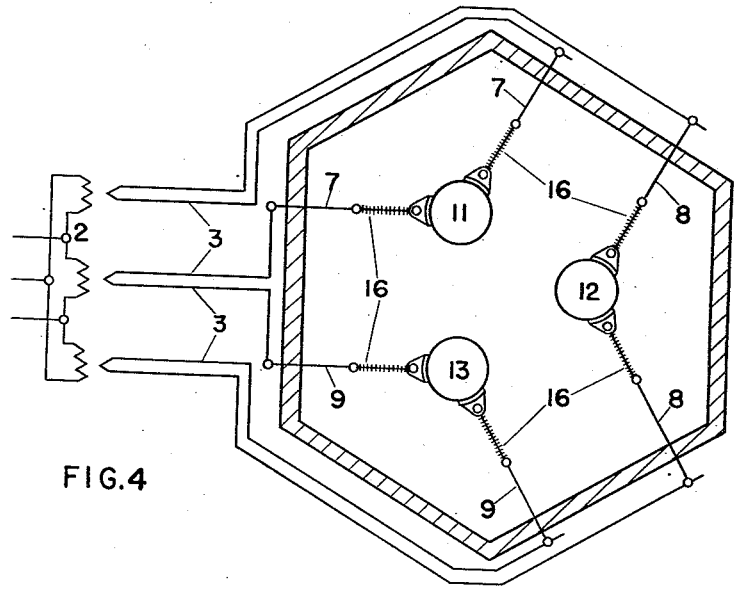
Figure 5:
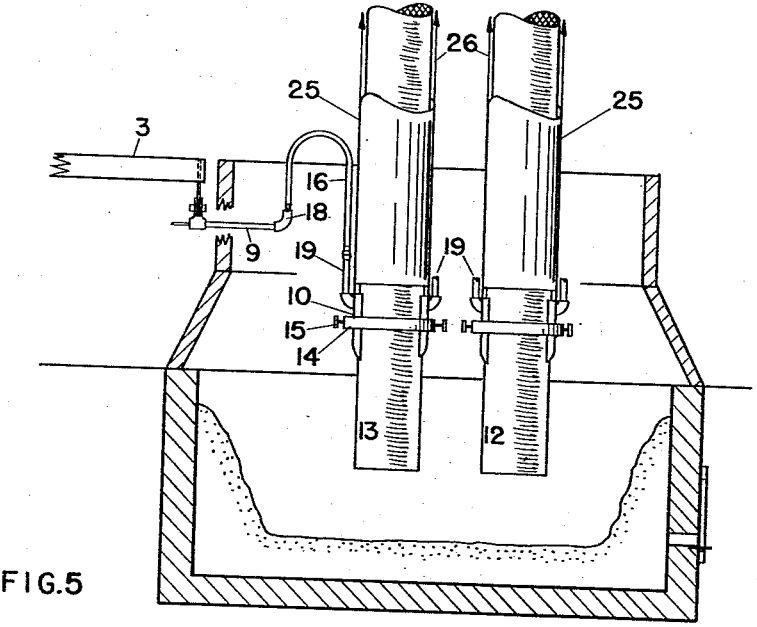

Figures 4 and 5 serve to illustrate schematically a calcium carbide furnace utilizing the flexible cables of the invention and electrical connections rendered practicable for the furnace by the use of the cables.

Figure 1:
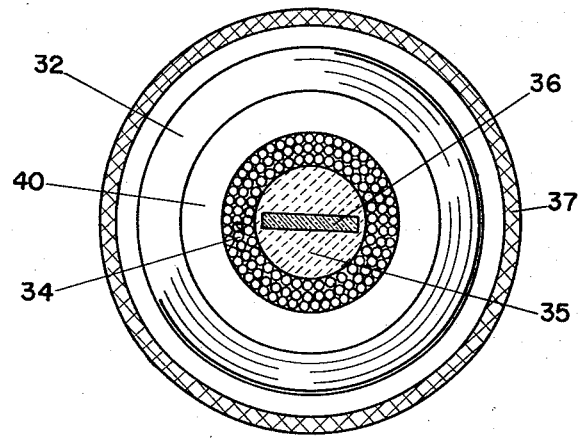
Figure 1 is a cross-sectional view of the cable.

Figure 1, showing a cross-sectional view of a water-cooled flexible cable constructed according to this invention, illustrates most clearly the arrangement of its essential elements. A flexible conductor 34 is standed around a core 35 made of elastic material such as neoprene. At the center of core 35 is embedded a strip of resilient metal 36 which may be either flat or corrugated. An outer flexible tube 32, having an internal diameter greater than the outside diameter of conductor 34, provides a space 40 for the passage of a cooling fluid. The flexible tube 32 may be of metal, e. g. seamless flexible tubing, or of non-metallic material such as neoprene, the choice depending mainly on the ambient temperatures to which the cable is exposed. If the flexible tube 32 is metallic, it is preferable to provide a cover 37 made of flexible heat-resistant material, such as asbestos fabric, to prevent arcing which would otherwise occur if the cable made contact with other objects at a different electrical potential. The outer cover is held in place by clamp 38 (Fig. 3) or by other suitable means. In the process of manufacture it is found convenient to extrude the strip of resilient metal 36 together with the elastic material 35 through a die to form a core with circular cross-section. In this operation the core is bound with a tape 41, Figures 2 and 3, which holds it firmly together during any further processing which may be required prior to stranding the flexible conductor around it, e. g. vulcanizing the resilient core. The flexible conductor 34 may be taped with a non-abrasive tape 43 secured by binding wire 44 or by other suitable means. This tape would serve to prevent wear due to relative motion between the flexible conductor and outer flexible tube, and it would also hold the conductor strands in place. The tape should preferably be porous and able to withstand hot water, e. g. "Fiberglas" tape. Alternatively, any non-abrasive heat-resistant material, such as neoprene, might be used in such manner as to keep the conductor and tube out of contact with one another without blocking the passage for a cooling fluid.

Electrical conductor cables of the type referred to are not always exposed to high ambient temperatures, e. g. flexible cables for arc furnaces and electric welding equipment. For these applications liquid cooling is therefore optional and the cables may be made to include only the flexible conductors with spring cores and terminals without water passages.

Figure 2:
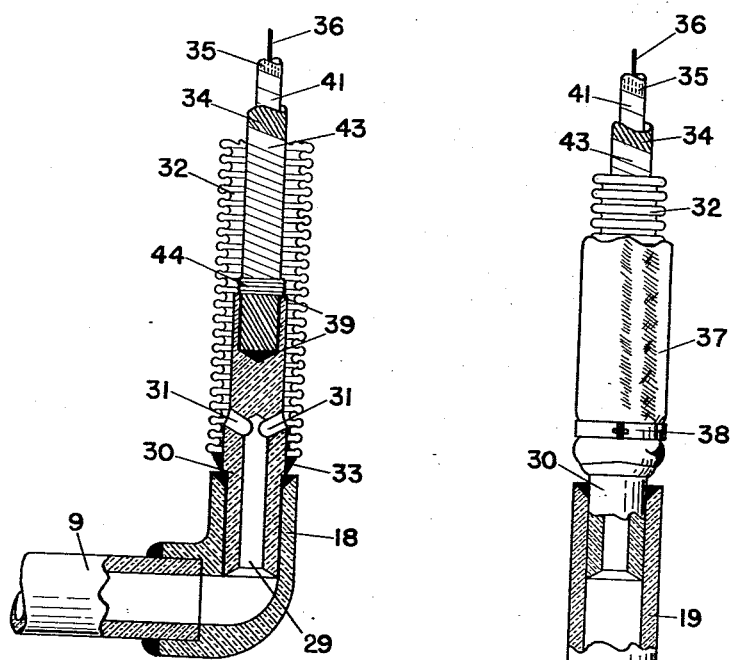
Figure 2 is a sectional view of one end showing details of a suitable terminal and a terminal connection.
Figure 3:
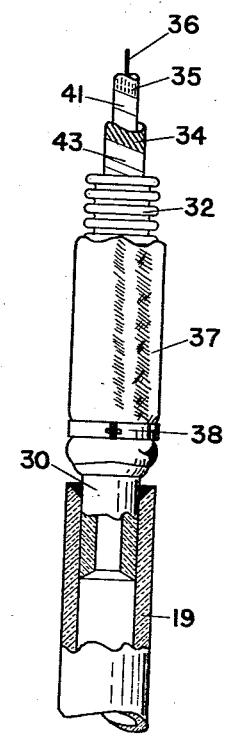
Figure 3 shows further details and a sectional view of an alternative terminal connection.

The flexible cable of this invention is conventionally provided with metal terminals, e. g. part 30, Figures 2 and 3, usually of copper, having one end adapted for securing electrically and mechanically the flexible conductor with spring core and the other end adapted for connection to a terminal fitting such as 18 or 19, shown in Figures 2 and 3. The flexible tube 32 is secured to the terminals and passages 29 and 31 communicate with space 40 to form a passage for water or other cooling fluid. Figure 2 indicates that the cored conductor 34 is soldered in the terminal receptacle at 39 and the flexible tube 32 is secured to terminal 30 by solder 33. Alternatively, the conductor may be secured in the terminals by other suitable means and if the flexible tube is non-metallic it may be clamped to the terminals.

Figures 4 and 5, illustrating utilization of the cables of this invention in a calcium carbide furnace, show that low voltage current, supplied by a transformer 2, is carried by interlaced (alternatively plus-minus) bus bars 3, which are extended as far as possible around the furnace to points from which the uninterlaced connections with the electrodes are as short as practicable. From these points the current is carried to the electrode contact shoes 10 by heavy copper tubes 7, 8, and 9, through flexible cables 16, herein described and claimed, and heavy copper tubes 19. A clamping ring 14 and clamping bolts 15 serve to make effective contact between the contact shoes 10 and the electrodes 11, 12, and 13. The contact shoes 10 are mechanically linked with metal cylinders 25, which surround the electrode and form parts of the electrode control gear operating in the direction indicated by arrows 26. The load current is regulated by raising or lowering the electrodes, thus increasing or decreasing their penetration in the furnace charge of lime and coke with corresponding changes in the electrical resistance of the charge. Flexible cables 16 accommodate movements of the electrodes. The heavy tubes 7, 8, 9, and 19, contact shoes 10 and clamping ring 14, as well as flexible cables 16, are water cooled to enable them to resist the heat of the furnace.

The strip of resilient metal at the center of the core functions to make the cable self-supported when mounted in the shape of an upright arch as indicated at 16, Figure 5. In this position the strip of resilient metal makes the cable flexible in a vertical plane passing longitudinally through its center and rigid in a transverse direction.

The height of the horizontal connections between the interlaced bus bars 3, Figure 5, and the electrode 13 is determined by the amount of clearance under them which is required for operating the furnace. Since the cable 16 is self-supported when its terminals are arranged to hold it in the form of an upright arch, it may be installed as indicated. In order to obtain the same clearance with a suspended cable it would be necessary to raise the interlaced bus bars 3 together with the horizontal tube 9 and to increase the length of tube 19. It is therefore apparent that the flexible cable of this invention provides means for reducing the length and consequently the reactance of the electric circuit. Furthermore, the extension of the interlaced bus bars, to reduce the amount of uninterlaced connection, also reduces the reactance of the electric circuit over that of a conventional carbide furnace in which flexible parts of the connections to the electrodes are located outside the furnace. For example, the 60 cycle reactance of 12,000 kw. conventional carbide furnaces is found to be approximately 1,400 microhms, but with connections as illustrated in Figure 4 it is only about 800 microhms.

Numerous advantages are derived from the position of the spring core at the center of the cable and from the stranding of the flexible conductor around the core so that the total length of any element of the cored conductor (except the elastic parts of the core) is unchanged no matter how the cable is bent or looped in the plane defined by the long axis of the strip and a line perpendicular to its transverse axis. (1) The cable may be fabricated in straight lengths and supported in the form of an upright arch with its terminals either vertical or inclined towards one another at any desired angle. A flexible conductor cable having non-elastic elements whose length tends to change when the cable is bent must be fabricated and maintained with a pre-determined shape of bend, i. e., with its terminals parallel or inclined towards one another at a given angle. (2) The cable is adapted to accommodate changes in bending shape and alignment such as occur in service. Lack of this property in other cables of the same class introduces internal stresses which greatly reduce their useful life. (3) The construction of the cable is such that none of its elements can become displaced. Deficiency in this respect has been a source of trouble with other furnace cables of the same class which the following examples serve to illustrate: (a) In a previously developed cable, described in Canadian Patent 441,952, flat spring strips located in the water passage between the flexible conductor and outer flexible tube get out of alignment causing excessive wear on the internal surface of the flexible tube which soon results in leakage of the cooling water. (b) A cable made with the flexible conductor divided into four sectors and bound around a spring strip failed in an accelerated aging test because of the binding element becoming displaced. (4) The electrical characteristics of the flexible conductor are improved as a result of its cored construction. The resistance to alternating current and the reactance are each less than that of a conductor having its strands more concentrated. The effective resistance of a cored conductor is less because of reduction in skin effect, and its reactance is decreased in proportion to the increase in the length of the radius or the circumference of the conductor. This feature is of particular importance because of the magnitude of the currents carried by the cable. (5) Imperfections in the construction and operation of conventional cables, mentioned above, account for the tendency to abandon their use as a means for improving the electrical characteristics of electric furnaces. The design of the water-cooled flexible cable of this invention is such that these imperfections are eliminated, thereby providing a self-supported water-cooled flexible cable suitable for electric furnace applications.

Other advantages of the apparatus described will be apparent to those skilled in the art. It will also be understood that various modifications may be made in the specific embodiments described without departing from the spirit of the invention or the scope of the following claims.

What is claimed is:
1. An electrical conductor cable comprising in combination: (1) an elongated circular core of elastic material having embedded at its center a strip of resilient metal (2) a flexible conductor stranded around said core and (3) an external flexible tube having an internal diameter greater than the outside diameter of said flexible conductor whereby a passage is provided for a cooling fluid.

2. An apparatus according to claim 1 in which the external flexible tube is metallic.

3. An apparatus according to claim 2 including in combination an envelope of heat-resisting fabric.

4. An apparatus according to claim 3 including in combination metal terminals adapted to secure the ends of the various elements of the cable, to provide external communication with the passage for a cooling fluid, and to supply suitable means for connecting the cable in an electric circuit.

5. An apparatus according to claim 1 in which the external flexible tube is non-metallic.

6. An electrical conductor cable comprising in combination (1) an elongated circular core of elastic material having embedded at its center a strip of resilient metal (2) a flexible conductor stranded around said core (3) an external flexible tube having an internal diameter greater than the outside diameter of said flexible conductor whereby a passage is provided for a cooling fluid (4) metal terminals adapted to secure the ends of the various elements of the cable, to provide external communication with the passage for a cooling fluid, and to supply suitable means for connecting the cable in an electric circuit; the arrangement of the component elements of the cable being such that when its terminals are held in suitable spaced relation, either vertically or inclined towards one another, the cable is self-supported in the form of an upright arch, flexible in a vertical plane passing longitudinally through the center of the cable and rigid in a transverse direction.

7. An apparatus according to claim 6 including in combination non-abrasive material held between the flexible conductor and outer flexible tube in such manner that it keeps the conductor and tube out of contact with one another but does not obstruct the passage for cooling fluid.

8. An apparatus according to claim 6 including in combination non-abrasive tape around the flexible conductor for holding its strands in place and preventing wear due to relative motion between the flexible conductor and outer flexible tube.

9. An electrical conductor cable comprising in combination (1) an elongated circular core of elastic material having embedded at its center a strip of resilient metal (2) a flexible conductor stranded around said core.

10. An electrical conductor cable comprising in combination an elongated circular core of elastic material having embedded at its center a strip of resilient metal, a flexible conductor stranded around said core, and metal terminals adapted to secure the ends of the various elements of the cable and to provide suitable means for connecting the cable in an electric circuit.

References Cited in the file of this patent

UNITED STATES PATENTS

| Number | Name | Date |
|---|---|---|
| 592,441 | Patterson | Oct. 26, 1897 |
| 1,853,101 | Von Henke | Apr. 12, 1932 |
| 1,937,981 | Rosenthal | Dec. 5, 1933 |
| 2,181,084 | Aken | Nov. 21, 1939 |
| 2,235,523 | Hull | Mar. 18, 1941 |
| 2,440,668 | Tarbox | Apr. 27, 1948 |
| 2,701,818 | Tims | Feb. 8, 1955 |